United States Patent [19]

Markulin

[11] Patent Number: 5,747,125
[45] Date of Patent: May 5, 1998

[54] FIBROUS COMPOSITE CELLULOSIC FILM AND METHOD

[75] Inventor: John Markulin, Oak Lawn, Ill.

[73] Assignee: Viskase Corporation, Chicago, Ill.

[21] Appl. No.: 684,347

[22] Filed: Jul. 18, 1996

[51] Int. Cl.$^6$ .............................. D01D 5/00; A22C 13/00
[52] U.S. Cl. ..................... 428/34.8; 264/203; 264/207
[58] Field of Search ................................ 264/187, 203, 264/207; 524/31; 428/34.8

[56] References Cited

U.S. PATENT DOCUMENTS

| | | |
|---|---|---|
| 2,179,181 | 11/1939 | Basel et al. . |
| 2,926,116 | 2/1960 | Kelm . |
| 4,952,431 | 8/1990 | Robertson et al. . |
| 5,470,519 | 11/1995 | Markulin . |
| 5,603,884 | 2/1997 | DuCharme, Jr. et al. .............. 264/203 |

FOREIGN PATENT DOCUMENTS 712889  5/1996  European Pat. Off. .

Primary Examiner—Mathieu D. Vargot
Attorney, Agent, or Firm—Roger Aceto

[57] ABSTRACT

A crosslinked cellulose composite film including a regenerated cellulose matrix containing a uniform dispersion of hemp fibers and a poly(ethylene oxide) plasticizer. A method for forming the film includes mixing a slurry of the hemp, poly(ethylene oxide) and a cellulose solvent with a cellulose solution, extruding the mixture, regenerating the cellulose from the solution to form the matrix containing hemp fibers, contacting with a crosslinking agent and then drying.

23 Claims, No Drawings

FIBROUS COMPOSITE CELLULOSIC FILM AND METHOD

FIELD OF THE INVENTION

The present invention relates to a cross linked composite film comprising a uniform dispersion of cellulosic fibers in a regenerated pure cellulose matrix.

BACKGROUND OF THE INVENTION

Cellulose is a natural polymer that has been used for centuries to make various forms of paper. More recently, it has been chemically regenerated to make fibers, transparent paper, cellophane, films, and casings for industrial and food related uses. These cellulose-based casings are well known for use in food products, such as sausages.

Regenerated cellulose polymer used for making both casings and film is most commonly produced by the well-known viscose process. In the viscose process, a natural cellulose, such as wood pulp or cotton linters, is treated with a caustic solution to activate the cellulose to permit derivatization and extract certain alkali soluble fractions from the natural cellulose. The resulting alkali cellulose is shredded, aged, and treated with carbon disulfide to form sodium cellulose xanthate, a cellulose derivative. The sodium cellulose xanthate is then dissolved in a weak caustic solution. The resulting solution, or viscose, is ripened, filtered, deaerated and extruded as a film or tube into coagulation and regenerating baths containing salts and sulfuric acid. In these acidic baths, the sodium cellulose xanthate, e.g., viscose, is decomposed by a chemical reaction and hydrolyzed back to a pure form of cellulose.

Cellulose food casings generally are made in either a nonreinforced or a reinforced form. Nonreinforced casing consists of a tubular film of regenerated cellulose polymer having a wall thickness ranging from about 0.025 mm (0.001 inches) to about 0.076 mm (0.003 inches) and made in diameters of about 14.5 mm (0.57 inches) to about 203 mm (8 inches).

Reinforced casings are commonly called "fibrous" casings to distinguish them from the nonreinforced cellulose casings. Here, a lighter viscosity viscose is used for nonreinforced casing is extruded onto a sheet or tube of paper prior to entering the coagulation and regenerating baths. The result is that the regenerated cellulose impregnates and bonds to the paper substrate. Fibrous casings have a wall thickness in the range of 0.050 mm (0.002 inches) to 0.102 mm (0.004 inches) and are made in diameters of about 40.6 mm (1.6 inches) to 193 mm (7.5 inches) or greater. Fibrous casings have a dimensional stability that is greater than that found in nonreinforced casing. This dimensional stability is imparted by the paper reinforcement which provides the casing with the property of stiffness and makes them less extensible than nonreinforced casings. Thus, while both fibrous and nonreinforced casings have about the same tensile strength at break, the fibrous casing has a higher initial wet modulus. Modulus as used herein is the tensile strength of the casing measured at an elongation of 5%. For example, the tensile strength to breakage of a conventional fibrous casing may be on the order of 2.3 k/mm$^2$ (3.3 lb/inch-mil) in the machine direction and its tensile strength at an elongation of 5% may be on the order of 8.8 to 10.7 k/mm$^2$ (12.5 to 15.2 lb/inch-mil).

As fibrous casings are stiffer and are less extensible than nonreinforced casings, they assure that once the casing is stuffed with meat each linear inch of casing will contain a specific weight of meat. This enables the sausage manufacturer to easily prepackage weights of sausage meat by number of slices instead of by weight.

Fibrous casing also may be made by using other cellulose derivatives, such as cellulose carbonate to impregnate the fibrous paper. U.S. Pat. No. 5,277,857 suggests still another way to make a fibrous casing. Here the fibrous paper is coated or impregnated with a thermoplastic cellulose solution composed of a natural cellulose (such as wood pulp, cotton linters or hemp) directly dissolved (without derivation) in a cellulose solvent such as N-methylmorpholine-N-oxide (NMMO). The coated paper is contacted with a cellulose nonsolvent such as water which draws the NMMO from the cellulose solution causing the dissolved cellulose to regenerate thereby leaving the fibrous paper bonded with a coating of pure, regenerated cellulose.

The process of coating a paper with viscose is the most widely used process for making fibrous casing. The draw back of this method is that undesirable side products such as sulfur, carbon disulfide and hydrogen sulfide are produced during the chemical reaction to regenerate the cellulose derivative back to pure cellulose. The alternative method as noted in the '857 Patent involves use of a polymeric cellulose solution formed by means of a simple dissolution of cellulose (rather than derivatization) and is considerably more environmentally friendly. However, to the best of applicants' knowledge, there has been no commercial application involving the production of a fibrous casing by coating a base fibrous paper with a nonderivatized cellulose solution.

The use of a non derivatized cellulose to form a fibrous casing is further discussed in EP published application 95-118159. Here the use of a base paper is avoided by forming a compounded fibrous dope composition comprising a solution of cellulose, amine oxide, water, and a second fibrous material partially solubilized in the solution. With the teachings of EP 95-118159, casings and other articles can now be made without the use of a paper web. When further treated with a cross linking agent, films and casings made of this fibrous dope composition are said to have an initial wet modulus or degree of dimensional stability and tensile strength essentially equivalent to traditional fibrous casing. If not further cross linked, the films and casings have a dimensional stability similar to nonfibrous casings, stretchy instead of stiff.

As disclosed in EP 95-118159, the compounded fibrous dope composition is made by mixing together a material known as "dope", which is a cellulose source, often a wood pulp, dissolved in aqueous amine oxide, preferably NMMO, and a fibrous material. This fibrous material which may or may not be the same cellulose used in the dope, is wetted, plasticized, and soluble in the amine oxide and water. Mixing the dope and fibrous material is conducted in a fashion intended to avoid dissolution of the fibrous material. For example, adjusting the energy input to accomplish mixing by limiting the shear and temperature required to completely disperse the fiber in the dope produces a new compounded dope composition containing a uniform dispersion of whole, intact, as well as partially swollen, plasticized, partly dissolved and otherwise degraded fibers of the fibrous material. When this compounded dope composition is extruded into a tube or film and regenerated into a finished article, the partially solubilized fibers of the fibrous material are visible under a light microscope.

The film produced by this method is a composite in that the incremental additions of the added material (cellulose fibers) to a high percentage of the overall composite do not cause the degradation of any salient property of these compositions. For purposes of this application, a "composite" is formed when a material which is added to a polymer, does not disrupt the integrity of the original polymer and adds its own characteristics, such as strength, stiffness or dimensional stability, to the polymer.

The composite film as disclosed in EP 95-118159 may further be treated with a crosslinking agent to improve film properties such as stiffness and tensile strength. Use of a crosslinking agent in connection with the manufacture of paper and fibrous casing is known. For example, it is known that the wet strength of paper can be improved by crosslinking. A suitable crosslinking agent reacted with the composite film will form a bond between the hydroxyl groups of the regenerated cellulose or between the hydroxyl groups of the regenerated cellulose and the hemp to make the resulting structure stiffer. U.S. Pat. No. 2,926,116, for example, discloses treatment of paper with a thermosetting resin such as the reaction product of epichlorolydrin and a polyamide to improve wet strength. The reaction product is a cationic resin and a typical product of this type is sold by Hecules Incorporated under the trade name KYMENE®.

U.S. Pat. No. 4,952,431 discloses an improvement in the paper for use in making a fibrous casing wherein the paper is bonded with cellulose carbonate and an alkaline curing resin such as KYMENE. In this respect, the process involves forming a fibrous sheet composed by hemp fibers and dip coating the sheet with a solution containing cellulose carbonate and KYMENE. The treated material is dried and used as the base paper in the manufacture of fibrous casing. An interesting aspect from the '431 Patent is that the KYMENE addition improved the properties of the carbonate bonded paper but the strength of the viscose bonded material showed little change as a result of the KYMENE addition.

In EP 95-118 159, testing the effects of crosslinking the composite is accomplished by contacting the composite film with the crosslinking solution and then drying to cause the crosslinking reaction. The resulting film then is rewet for purposes of testing.

In actual practice, it is common in fibrous casing manufacture to plasticize the casing with a polyol such as glycerine. The sequence then is to impregnate the base paper with viscose, react the viscose to regenerate the cellulose, wash to remove by-products of the reaction, add a plasticizer, such as glycerine, to the wet casing and then dry down to a moisture content of 10–12% total weight. The addition of a plasticizer is essential to insure that the casing after drying is sufficiently supple to permit handling and mechanical operations such as flattening and reeling. Without such a plasticizer, the dry casing is embrittled and may crack or tear when subject to these mechanical operations. Adding the glycerine to the viscose prior to extrusion is not practical. This is because the glycerine is water soluble and will wash out of the casing during the washing step.

A similar sequence can be followed to form a fibrous composite casing utilizing the NMMO technology as set out in EP 95-118 159. This would involve extruding the fibrous composite, contacting with a nonsolvent to regenerate the dissolved cellulose portion of the composite, washing to remove the solvent, adding a plasticizer to the wet casing and drying. Such a casing, which is not subject to a crosslinking reaction, would be deficient in stiffness, tensile strength and dimensional stability. Accordingly, the composite casing preferably is reacted with a crosslinking agent to provide the required stiffness, and tensile strength and dimensional stability.

It was found that the point in this sequence where exposure to the crosslinking agent occurred is critical. For example, contacting the wet casing with the crosslinking agent after plasticizing with glycerine provided no improvement in casing properties. It is speculated that in this sequence the crosslinking agent reacted with the hydroxyl groups of the glycerine plasticizer rather than with the cellulose hydroxyl groups. As noted above, omitting the glycerine plasticizer is not a practical solution because otherwise the dried casing is too brittle for subsequent handling and machine operations such as reeling the casing.

Accordingly, to provide crosslinking, it was found necessary to treat the wet casing with the crosslinking agent prior to plasticizing the casing with glycerine. This required the addition of a drying step. A first drying step is needed to bring the wet casing to a moisture content of 5–10% because it is in this moisture range that the crosslinking agent is activated. Then after the dry casing is rewet with a plasticizing solution of glycerine and water a second drying step is needed to bring the casing back to a moisture content based on total weight of 10% to 15% for storage, handling and further mechanical operations such as printing. The extra drying step is objectionable in that it adds another variable to the production process and increases the costs and time of production. Without a plasticizer in the casing to make the casing flexible, there is a limit to the amount of mechanical operations that can be preformed on the dry casing without damaging the casing.

Accordingly, an object of the present invention is to provide an improved method for crosslinking a composite film comprising a uniform dispersion of a cellulose fiber in a regenerated cellulose matrix.

Another object of the invention is to provide a method for crosslinking a fibrous cellulosic composite film utilizing a single drying step.

A further object of the invention is to provide a method of crosslinking a plasticized fibrous cellulosic composite film wherein the crosslinking agent is compatible with the plasticizing agent.

Yet another object is to provide a plasticized polyol-free cross linked fibrous cellulosic composite film.

SUMMARY OF THE INVENTION

It now has been unexpectedly found that use of a poly (ethylene oxide) or PEO as a plasticizing agent will greatly simplify a method of extruding and crosslinking a fibrous cellulosic composite. Reference is made to a general description of a method for producing a fibrous cellulosic composite in copending application Ser. No. 08/342,287, now U.S. Pat. No. 5,603,884 (corresponding to EP 95-118 159), the disclosure of which is incorporated herein by reference.

Briefly, as disclosed in Ser. No. 08/342,287, now U.S. Pat. No. 5,603,884 an extrudable thermoplastic fibrous composite can be prepared which includes a uniform dispersion of a fibrous material, preferably a natural cellulose fiber, such as hemp, in a cellulose solution composed of an amine oxide cellulose solvent, cellulose and water. The composition is extrudable as a tubular film or sheet. The extruded material passes into a bath which contains water or some other cellulose nonsolvent. In the bath, the amine oxide solvent is drawn out of the extruded material so the cellulose in the solution is regenerated. This produces a wet gel tube or sheet comprising a matrix of pure regenerated cellulose containing a uniform dispersion of fibers.

After regeneration of the cellulose matrix, crosslinking with a suitable agent is desired in order to strengthen and stiffen the film. As noted hereinabove, it has been found that little, if any, crosslinking will occur if the film is plasticized first with glycerine and then contacted with a crosslinking agent; whereas crosslinking prior to plasticization with glycerine leads to the requirement of two drying steps.

It now has been found that the film can be plasticized and cross linked in an efficient manner if an olefinic oxide polymer is mixed with the extrudable thermoplastic solution. The appropriate olefinic oxide polymer provides a suitable plasticizer and does not interfere with the action of the crosslinking agent.

This probably is because these polymers, unlike a conventional plasticizer such as glycerine, are much less reactive toward the crosslinking agent due to the fewer available hydroxyl groups and the very large polymer chains which are less mobile than small molecules such as glycerine. Another advantage of these polymers is that they are not volatile at the extrusion temperature of the fibrous composite and will not wash out during removal of the amine oxide solvent. As a result, the olefinic oxide polymer mixed with the fibrous composite prior to extrusion will be carried through the extrusion and regeneration process so that no further plasticizer need be added in subsequent operations.

Olefinic oxide polymers such as poly(ethylene oxide) with molecular weights of at least about 70,000 and up to about $5 \times 10^6$ are dry, free-flowing white powders, which are substantially completely soluble in water at temperatures up to about 98° C. They are substantially crystalline materials. Commercially available materials reportedly have melting points ranging from about 62° to 67° C. as determined by X-ray and NMR standard methods of analysis and have polymer densities of from about 1.15–1.26 g/cm³. The chemical structure of poly(ethylene oxide) resin is poly(O—$CH_2$—$CH_2$)$_x$.

The very high molecular weight of these resins indicates that these materials have extremely small concentrations of reactive end groups. The result is a resin having little or substantially no end group reactivity. Consequently, there are few reactive hydroxyl groups available. As used herein the term "molecular weight" refers to the weight average molecular weight(Mw).

Poly(ethylene oxide) is commercially available from Union Carbide Corporation under the trademark POLYOX®. POLYOX® water-soluble resins, CAVES Registry No. 25322-68-3, are described as being nonionic water soluble polymers of poly(ethylene oxide) which are available in a range of molecular weights. For example, the degree of polymerization of POLYOX® resins as indicated by "X" in the formula set out above is disclosed as ranging from about 2,000 to about 180,000. Further information of the properties, functions and uses of POLYOX® resins are disclosed in the brochure POLYOX® WATER-SOLUBLE RESINS (Copyright 1988, 1990, Union Carbide Chemicals & Plastics Technology Corporation) which brochure is hereby incorporated by reference in its entirety.

In U.S. Pat. No. 5,470,519 there is a disclosure of the incorporation of a poly(ethylene oxide) having a molecular weight of at least 70,000 in a cellulose article such as a sausage casing by adding the poly(ethylene oxide) to viscose (a cellulose derivative in solution) to produce a homogenous mixture prior to extrusion. The olefinic oxide polymer replaces a portion of the cellulose and the resulting regenerated sausage casing is said to require the addition of little, if any, plasticizer, such as glycerine, to be functional. While the possibility of adding an olefinic oxide polymer to an extrudable cellulose solution including a N-methyl-morpholine-N-oxide (NMMNO) is mentioned in U.S. Pat. No. 5,470,519, this patent only has examples of use of an olefinic oxide polymer in the viscose process and there are no NMMO technology examples.

According to the present invention, a method is provided for producing a polyol-free cross linked fibrous cellulosic composite film suitable for use as a food casing by the steps of:

a) providing an extrudable thermoplastic composition composed of an aqueous solution of an amine oxide cellulose solvent, a nonderivatized cellulose solubilized in the solvent and an olefinic oxide polymer and the composition containing a uniform dispersion of unsolubilized cellulose fiber;

b) extruding the a film of the thermoplastic composition;

c) washing the extruded thermoplastic composition with a non solvent to remove the amine oxide cellulose solvent and thereby regenerate the solubilized nonderivatized cellulose to form a wet gel film comprising a continuous phase of regenerated cellulose containing the olefinic oxide polymer and the unsolubilized cellulosic fiber uniformly dispersed in the continuous phase;

d) contacting the wet gel film with a cross linking agent; and d) drying the wet gel film in the presence of the crosslinking agent to activate the agent.

In another aspect, the present invention may be characterized by a cross linked fibrous cellulosic composite film suitable for use as a food casing comprising a continuous phase of a nonderivatized cellulose regenerated from a cellulose solution of amine oxide cellulose solvent, cellulose and water, said continuous phase containing an olefinic oxide polymer, a uniform dispersion of unsolubilized cellulosic fibers and an effective amount of a crosslinking agent.

For purposes of this specification, "nonderivatized" cellulose means a cellulose that has not been subjected to covalent bonding with a solvent or reagent but has been dissolved by association with a solvent or reagent through complexation, by van der Waals forces, hydrogen bonding, or the like.

"Nonderivatized cellulose casings" and "nonderivatized cellulosic casings" mean food casings prepared from non-derivatized cellulose as defined above.

"Derivatized cellulose casings" and "derivatized cellulosic casings" mean food casings prepared by the regeneration of a derivatized cellulose, preferably using the viscose process as described above.

"Nonsolvent" means a liquid that is not a cellulose solvent.

DETAILED DESCRIPTION OF THE INVENTION

Although the discussion of the invention as follows is generally directed to the production of a fibrous-like sausage casing, it is to be understood that any shaped or extruded article, for example, paper, other films, veneers and the like are included in the intent of the invention. The use of casing as the primary shaped article in the description as follows is for convenience only and is not meant to exclude other shaped articles as known to those skilled in the art.

The general process for the manufacture of a fibrous cellulose composite film using direct dissolution technology is disclosed in U.S. Pat. Nos. 5,277,837 and 5,451,364 and in EP 95-118159, the disclosures of which are incorporated herein by reference. As a first step in the process, a natural cellulose such as wood pulp or cotton linters is dissolved in an aqueous amine oxide cellulose solvent. This forms a polymeric solution by means of a simple dissolution of cellulose and involves no chemical reaction to form a soluble cellulose derivative. The cellulose dissolution process is described in U.S. Pat. No. 2,179,181. This patent describes the dissolution of natural cellulose by a tertiary amine oxide to produce solutions of relatively low solids content, for example, 7% to 10% by weight cellulose dissolved in 93% to 90% by weight of the tertiary amine. The cellulose in the resulting solution is nonderivatized prior to dissolution. U.S. Pat. No. 3,447,939 discloses use of N-methylmorpholine-N-oxide ("NMMO") as the amine oxide solvent of choice.

More recent patents, such as, U.S. Pat. Nos. 4,145,532 and 4,426,288, improve upon the teachings of the '939 patent. U.S. Pat. No. 4,145,532 discloses a process for making a solution of cellulose in a tertiary amine oxide, such as NMMO, that contains 10–35% by weight of cellulose. This higher solids content, achieved in part by including an amount of water (from 1.4% to about 29% by weight) in the tertiary amine oxide solvent, provides a solution adapted for shaping into a cellulosic article by extrusion into fibers, films, or casings. In U.S. Pat. No. 4,426,288, the NMMO-cellulose polymeric solution contains an additive that reduces decomposition of the cellulose polymer chain so that molding or spinning substances are obtained with only slight discoloration and that will yield molded shapes distinguished by improved strengths upon regeneration in a nonsolvent such as water.

The polymeric solution or "dope" formed by the direct dissolution of cellulose with NMMO is thermoplastic and is extrudable as set out in U.S. Pat. Nos. 5,277,837 and 5,451,364.

In order to form a fibrous composite of the dope, it is necessary to incorporate fibers into this dope composition such that the fibers are uniformly dispersed in the dope. In accordance with the present invention it also is necessary to incorporate the olefinic oxide polymer into the dope so that an extrudable composition is formed which contains both unsolubilized fibers and the olefinic oxide polymer. This is done by forming a slurry containing the fibers and the olefinic oxide polymer and then adding the slurry to the dope. This forms a fibrous dope composition including the olefinic oxide polymer which is extrudable as a film. The amount of olefinic oxide polymer in the dope preferably is in an amount sufficient to permit plasticization of the resulting film so that no polyol need be added to the film. It is believed that 1% to 3% of the olefinic oxide based on the total weight of cellulose in the film would be sufficient for this purpose.

For example, the fibrous dope composition can be made as set out hereinbelow. Although certain reagents and their volumes are specified, the reagents themselves and the amounts used can be changed by those skilled in cellulose and organic chemistry, in response to needs based on the exact volumes of composite to be produced and the exact materials used, particularly as taught by the present disclosure. The examples hereinbelow are for a composite made with dope produced from wood pulp and aqueous NMMO containing a fibrous material which is hemp. Other reagents will necessitate changes in this procedure that are fully within the skill of those practicing in this art area.

While hemp is a preferred fibrous material, fibrous materials that are useful in this invention include any fibrous materials that are wettable and partially plasticized by the dope (the amine oxide cellulose solution). This also includes fibrous materials that are fully soluble in the dope, provided however, that under the proper conditions of heat, work, and shear, these materials are not allowed to become overly plasticized or solubilized. A fibrous material such as wood pulp, which as a component of the dope is known to be totally soluble in the aqueous amine oxide solvent, can be added to the dope as a fibrous material, as long as conditions of mixing and heating are limited enough, thereby allowing the wood pulp fibers only to partially solubilize and plasticize into the continuous cellulose phase. Alternatively, the wood pulp fibers could be treated prior to mixing with the dope to inhibit a complete dissolution. However, of all the materials that fall within the above definition, hemp fiber is preferred.

The preferred material, manila hemp (abaca) is a member of the class of materials known as long vegetable fibers. These are distinguished from other vegetable cellulosic materials, as for example, cotton that is a seed hair, wood pulp, and grasses and straws, such as, bagasse and sugar cane stalks. Manila hemp is a member of the bast family, which is further subdivided to include those fibers from the stems of dicotyledonous plants including jute, ramie, and Sunn hemp. Other members of this family are the leaf fiber members, which derive from the fibrovascular tissue of certain large leaved monocotyledonous plants and include sisal, manila hemp (abaca), and phorium. The abaca plant, musa textilis, grows to a height of 12 to 25 feet or more and belongs to the mulberry family. It is grown in the Philippines and Ecuador.

Manila hemp fibers are the material of choice for the fibrous material at this time. These fibers impart their special characteristics to the finished casing, making it competitive with classic fibrous casing. Although it is not exactly known why the hemp fibers perform as well as they do, a possible explanation may be a combination of their size and molecular orientation as compared with that of wood pulp fibers.

These hemp fibers are generally longer than wood pulp fibers, at 2.7 mm to 6.2 mm (0.11 to 0.24 inches) for abaca, 2.7 mm to 4.6 mm (0.11 to 0.18 inches) for soft wood pulp, and 0.7 mm to 1.6 mm (0.03 to 0.06 inches) for hard wood pulp. The fiber length distribution curve of hemp is bimodal compared to wood pulp fibers that have a single maxima relative to fiber length. The short fiber lengths are about 75% to 80% of the total fiber content, with the remainder being very long and thin fibers. The longer hemp fibers increase dimensional stability and strength and the large number of very short fibers increase the cohesiveness of the very long fibers compared to traditional wood pulps.

Another difference seen between hemp fibers and wood pulp fibers resides in the morphology of the fibers. In wood fibers, cellulose polymer chains occur spirally, in 15° to 45° angles relative to the cell axis, whereas in hemp fibers, these are nearly parallel with the cell axis. Thus, the parallel cellulose polymer chains in hemp give greater structure than the cellulose polymer chains in wood pulp that are at an angle with the cell axis. A further difference is that the molecular weight of hemp generally is much higher than for wood pulp as reflected in the comparative viscosities of hemp and wood pulp.

However, the invention should not be limited to the use of hemp, as other materials are available. Examples of other useful fibrous materials include cotton linters, nylons, wood pulps with a very high molecular weight, as for example, those with a degree of polymerization higher than about 900 units, and regenerated cellulose fibers that have an increased orientation and stiffness, such as, high wet modulus rayons. Other useful regenerated cellulose fibers, for example, are those that are stabilized to swelling by crosslinking with a cellulose cross linker, such as, formaldehyde, bifunctional aldehydes, aldehyde modified resins, carboxylic acids or epoxides, epichlorohydrin or other carbohydrate reactive crosslinking agents normally known to those skilled in the art.

In order to make an article with a uniform dispersion of partially solubilized second fibrous material, the mechanical and thermal work done during the dispersion of the fibrous material into the amine oxide cellulose dope must be minimized in order to maintain the integrity of the fibers. This minimization must be done in particular when wood pulp is used as the fibrous material. It also applies to some nylons that are soluble in the cellulose solvent and all cellulosic fibers that are similar to pure wood cellulose and therefore ultimately fully soluble in the cellulose solvent. Hemp has a higher average fiber length, molecular weight and different crystalline orientation than wood pulp fibers, but it is nevertheless soluble in the NMMO solvent. It must be kept in mind that the final product must have discreet fibers present in the cellulosic film.

One way of producing an extrudable fibrous dope composition according to the invention is to add the olefinic oxide polymer to a warm aqueous NMMO solution. A suitable olefinic oxide polymer for purposes of the present invention is POLYOX® WSR N-10 having a molecular weight of about 100,000 which is sold by Union Carbide Corporation. The addition proceeds with stirring until all of the POLYOX is dissolved. After the POLYOX has been dissolved in the NMMO, the fibrous material is added. Preferably the fibrous material is another cellulosic material and a preferred material as noted above is hemp. In this respect hemp sheets, cut to small squares, is warmed and added to the heated POLYOX-NMMO aqueous solution. It is important that the hemp be warmed. Otherwise, the NMMO may begin to crystallize when the hemp is added. The mixture is stirred until the hemp fibers are uniformly distributed throughout the mixture and the hemp fibers begin to swell. Swelling of the hemp fibers is an indication of the onset of dissolution. While some dissolution of the hemp fibers is acceptable, it is important that the majority of the fibers maintain their fibrous integrity, remain whole and unsolublized.

In this fashion, an aqueous slurry is formed which includes the hemp fibers uniformly distributed in the NMMO wherein whole hemp fibers are visible under a light microscope. The amount of fibrous material, such as hemp, which is added may vary depending upon the film properties which are desired. For purposes of the present invention and to form a composite film which may substitute for a conventional fibrous sausage casing, the amount of hemp fiber in the slurry should be sufficient to provide from 30% to 40% hemp fiber based on the weight of regenerated cellulose in the film.

An aqueous slurry suitable for use in making a polyol-free fibrous cellulosic composite film according to the method of the present invention can comprise by weight in the range of 55% to 73% NMMO, 18% to 22% water, 9% to 23% hemp fiber and 0.4% to 0.8% olefinic oxide polymer (POLYOX).

This slurry is then added to a dope solution comprising a natural cellulose such as wood pulp dissolved without derivation in an aqueous tertiary amine oxide cellulose solvent.

The dope solution as described herein comprises by weight about 78% NMMO, 7% water and 15% dissolved cellulose. The slurry and dope solution are mixed together generally in the ratio of one part slurry to two parts dope so as to form a thermoplastic composition having in the in range, by weight, of 72% to 76% NMMO, 10% to 12% water, 9% to 11% dissolved cellulose, 3% to 8% unsolubilized hemp fiber and 0.1% to 0.3% of the olefinic oxide polymer.

The addition of the slurry to the dope can be as described in EP 118159. However, it is preferred that the addition be by means of a twin screw extruder. In this apparatus, the dope and the slurry of aqueous NMMO and hemp are added as separate streams and are combined, heated and thoroughly mixed in the apparatus.

The mixture is extruded into a bath containing a cellulose nonsolvent such as water to regenerate the dissolved cellulose. This regeneration occurs without a chemical reaction as the NMMO solvent is extracted from the extruded mixture by the nonsolvent bath. The result is a wet gel film comprising a regenerated pure cellulose matrix containing a uniform dispersion of the olefinic oxide polymer and hemp fibers including whole fibers and fibers which are partly solubilized. The resulting wet gel film, aside from water comprises, by weight, in the range of 54% to 73% regenerated cellulose, 25% to 44% undissolved hemp fibers and 1% to 3% olefinic oxide polymer.

The wet gel film is then contacted with a cross linking reagent. A suitable reagent is Kymene®-557H or Kymene® 450, products sold by Hercules Incorporated of Wilmington, Del., USA. These reagents are water soluble thermosetting cationic epichlorohydrin-polyamide resins. Other crosslinking resins, such as polyalkylenepolyamine-epichlorohydrin resins and amine polymer-epichlorohydrin resins, polyaminoamide-based epoxy curing agents, and polyfunctional aziridines are examples of chemicals that are useful for this step of the process. Other crosslinking compounds known in the art to crosslink hydroxyl containing polymers, such as formaldehyde urea and derivatized formaldehyde urea are also useful.

The wet gel film is dried to a moisture content of about 5% to 10% moisture based on the total weight of the film to cure the crosslinking agent so that bonds are formed between hydroxyl groups of the hemp fibers and the regenerated cellulose matrix. The regenerated cellulose matrix around the hemp fibers also is cross linked in this fashion. The film is then remoisturized to about 10–15% moisture to complete the process. Moisturizing can be accomplished by exposing the film to a humid air environment.

The following examples will serve to illustrate the invention.

EXAMPLE 1

A composite sample is prepared by heating 180 grams of aqueous NMMO (78% NMMO, 22% H$_2$O) to a temperature in the range of 50° to 60° C. The NMMO is stirred by hand with a glass rod to create a vortex and 1.0 gms of POLYOX N-10 is added by sifting into the center of the vortex. Stirring is continued until no solid POLYOX is observed. A hemp sheet is cut into nominally 3.175 mm to 6.35 mm squares and about 25 grams of the hemp are heated (50° to 60° C.) and are added to the heated NMMO-POLYOX mixture. The hemp and the NMMO-POLYOX mixture is stirred by hand until a uniform slurry is formed. The slurry is put into an oven at 50° to 60° C. for about thirty minutes. At the end of this treatment, the hemp fibers in the cut pieces have become separated and are uniformly distributed throughout the mass of the slurry. When viewed through a light microscope, whole hemp fibers can be seen which indicates that the slurry contains unsolubilized hemp fibers.

A layer of the slurry 3 to 4 mm thick is spread onto a plastic sheet and allowed to air cool and harden. It is then broken by hand and reduced to a powder using a Waring Blender.

A solid dope having 15 parts dissolved wood pulp, 78 parts NMMO and 7 parts water per 100 parts of dope is ground to a particle size in the range of 3 to 7 mm and is mixed with the powdered slurry in a ratio of about two parts ground dope to one part slurry. This forms a thermoplastic composition comprising by weight about 74.4% NMMO, 11.1% water, 4% hemp, 10% dissolved cellulose and less than 0.2% POLYOX.

The mixture of ground dope and the powdered slurry of hemp/NMMO/POLYOX is fed to a straight, 254 mm long single screw Braybender extruder having length-to-diameter ratio of 10:1. The mixture is melted in the extruder and fed to a vertical ribbon die having an extrusion outlet which is 6×0.028 inches (152×0.71 mm). The molten ribbon exuded from the die enters a water bath to remove the NMMO and produce a wet gel film.

The wet gel film produced in this fashion is about 71.2% regenerated cellulose based on the total amount of cellulose in the film and about 28.8% undissolved hemp fiber. The POLYOX content is about 1.6% based on the weight of the regenerated cellulose and about 1.2% based on the total amount of cellulose (regenerated cellulose plus hemp).

The wet gel film is placed on an embroidery hoop and immersed for 30 minutes in an water bath. The hooped film is then transferred to and immersed in a second aqueous solution containing 0.31% KYMENE made up from 25.0 gms KYMENE 557LX (12.5% solid) per 1000 gms of water for 45–60 minutes. The wet gel film is then dried at 115° C. for 45 minutes.

EXAMPLE 2

The same procedure as in Example 1 is followed except the wet gel film is immersed for 2 to 3 minutes in a 3% glycerine solution before drying instead of the 0.31% KYMENE solution.

EXAMPLE 3

A wet gel film also was made as set out in Example 1 but without using POLYOX in forming the NMMO/hemp slurry. The resulting gel film formed in this way was subject to three different treatments:

a. Immersed in a 3% glycerine solution for 30 minutes and then dried at 115° C. for 45 to 60 minutes.

b. Immersed in a 0.31% KYMENE solution followed by immersion in a 30% glycerine solution and then dried to cure the KYMENE.

c. Immersed in a 0.31% KYMENE solution and then dried (no immersion in glycerine prior to drying to cure the KYMENE).

The films of Example 1–3 after drying, were each rewetted by immersion in a 30% glycerine solution for purposes of tensile testing. The tensile strength of the rewetted film was tested in both the machine direction (MD) and the transverse direction (TD). Tensile strength can be described as the breaking or burst strength per unit area of a material subjected to a specified dynamic load, and defined in units of pounds per inch width per mil thickness of a sample material (N. Irving Sax and R. J. Lewis, Sr, eds., Hawley's Condensed chemical Dictionary, Eleventh Edition, 1987).

The stiffness, or dimensional stability, of a film is measured by the 5% wet secant modulus test, with results reported as units of pounds per inch width per mil thickness. Tensile strength tests were performed on an Instron U4301 (Instron Corporation, Canton, Mass., USA 02021). A modification of ASTM D-882 was used, where a 1"×2" sample was used with crosshead speeds of 20"/min., full scale load of 25 pounds. The breaking tensiles were calculated as pounds per 1" width per 1 mil. thick or PIM. The results as reported in Table I give the tensile strength in terms of kilograms per square millimeter with the comparable units of PIM appearing in parenthesis. The Table also gives the wet modulus of the rewet film at 5% elongation in the same units. The wet 5% secant modulus test was performed by the test method of ASTM D-882, modified to be read at 5% elongation instead of 1%. The percent of elongation at break for each film also is given in the Table.

TABLE I

Comparison of Various Fibrous Composite Films With and Without Polyox

| EXAMPLE | SAMPLE TREATMENT | MD/TD STRENGTH* | MD/TD % ELONG. | MD/TD WET MOD** |
|---|---|---|---|---|
| 1 | POLYOX/0.31% Kymene | 3.1/02.3 (4.4/3.2) | 49/100 | 8.1/03.7 (11.5/5.3) |
| 2 | POLYOX, 3% glycerine | 1.9/1.7 (2.7/2.4) | 46/111 | 3.1/2.3 (4.4/3.2) |
| 3A | 3% glycerine | 1.8/1.3 (2.6/1.9) | 49/103 | 4.8/2.0 (6.8/2.9) |
| 3B | 0.31% Kymene 30% glycerine | 2.1/— (3.0/—) | 56/— | 4.1/— (5.8/—) |
| 3C | 0.31% Kymene, no glycerine | 2.8/2.2 (4.0/3.1) | 38/74 | 7.3/3.6 (10.4/5.2) |

*at break
**at 5% elongation

A comparison of Examples 2 and 3A shows that the addition of POLYOX to the extrusion mixture (Example 2) does little to improve the tensile strength and modulus of the rewet film as compared to the film of Example 3A which has no POLYOX. On the basis of wet tensile strength and wet modulus, the film of Example 3A without POLYOX is not significantly different from the POLYOX-containing film of Example 2.

Example 3B shows that when the KYMENE is reacted in the presence of glycerine little or no crosslinking occurs. This is demonstrated by the tensile strength and low modulus of the rewet film of Example 3B (with KYMENE) which are not significantly different from the film of Example 3A (no KYMENE).

When there is no glycerine present, as shown in Example 3C, the KYMENE is effective to crosslink the film as evidenced by the improved wet tensile strength and higher wet modulus. This compares favorably with the film of Example 1, which represents an embodiment of the present invention. Thus, Examples 1–3 demonstrate that KYMENE is effective to crosslink the film in the presence of the poly(ethylene oxide) but is rendered ineffective in the presence of glycerine. Moreover, the poly(ethylene oxide) incorporated into the film of Example 1 is an effective plasticizing agent so no further plasticization would be required. All that is required to make the Example 1 film functional after drying to activate the crosslinking agent, is to raise its moisture content by passage through a controlled steam or moist air environment.

In contrast, the film of Example 3C has no plasticizer (neither glycerine nor POLYOX). Accordingly, while its wet tensile strength and modulus compare favorably with those of the Example 1 film, for it to be functional, the film has to be plasticized, typically by immersion in a glycerine-water solution, and then dried down to the appropriate water level. As noted hereinabove, this second drying step is not desired as it would add both cost and time to the production cycle.

EXAMPLE 4

As a further demonstration of the invention, a tubular film of the same composition as Example 1 was extruded and regenerated. The film was immersed first in a 30% glycerine solution and then in a 0.31% KYMENE solution and then the film was cured at about 77° C. After curing for 75 minutes the rewet film modulus at 5% elongation was only 4.1 kg/mm$^2$ (5.8 PIM). However, when the same extruded tubular film is immersed in only a 3% glycerine solution the same KYMENE treatment and curing cycle provides the film with a modulus of 9.6 kg/mm$^2$ (13.6 PIM).

This further shows the inability of KYMENE to perform its crosslinking function in the presence of glycerine.

EXAMPLE 5

Another series of tests demonstrates the present invention wherein a twin screw extruder is used for producing a composite film. In this case, a slurry of NMMO, hemp fibers and POLYOX is prepared using the method as set out in Example 1. The slurry comprises 4250 grams of aqueous NMMO (78% NMMO), 500 grams of hemp and 34 grams of POLYOX. This hemp slurry is aged for about two hours and, while still fluid, is introduced into one inlet of a ZE40 twin screw extruder manufactured by the Berstorff Corporation. A standard dope solution of 78 parts NMMO, 15 parts dissolved wood pulp and 7 parts water is introduced into a second inlet of the extruder.

The materials are introduced into the two inlets in a ratio of one part hemp slurry to two parts dope. The material streams are combined and mixed in the twin screw extruder to uniformly distribute the fibers throughout the mixture. The selection of the proper screw mixing elements and speed for uniformly distributing the fibers throughout the resulting mixture is within the skill of the art. Also, it should be appreciated that the temperature, residence time and work required to form the mixture should be controlled to insure that the hemp fibers are not solubilized or overly plasticized in the NMMO solvent as this tends to lower modulus and tensile strength. The thermoplastic mixture of slurry and dope in this example contains, based on total weight, about 75.09% NMMO, 11.18% water, 3.48% hemp fiber, 10% dissolved cellulose and slightly over 0.2% POLYOX.

The outlet of the extruder is connected to a 4 inch (10.16 cm) slot die having a die gap of 0.020 inches (0.508 mm). Flow of the combined material streams through the die is at a rate of about 15 kg/hr. At this rate, the temperature of the material streams through the extruder and the die does not exceed about 150° C. (302° F.).

The extruded ribbon of film passes into a water bath to extract the NMMO and regenerate the cellulose. The resulting gel film produced in this fashion has about the same percentage of regenerated cellulose and hemp based on the total amount of cellulose in the film as the film in Example 1. The POLYOX content, however, is about 2.3% on the basis of the regenerated cellulose and about 1.7% on the basis of the total cellulose in the film (regenerated cellulose plus hemp).

After regeneration, the film is immersed in a 0.31% KYMENE solution and cured by drying at 115° C. for 45–60 minutes. For purposes of tensile testing, the films are rewet. Films produced in this fashion have a rewet MD tensile strength (average of five samples) of 16 kg/mm$^2$ (22.68 PIM) and a rewet TD tensile strength of 9.2 kg/mm$^2$ (13.09 PIM). The MD and TD modulus (average of five samples) is 11.8 kg/mm$^2$ (16.82 PIM) and 2.7 kg/mm$^2$ (3.9 PIM) respectively. Similar films treated with glycerine only (no Kymene) have a rewet MD/TD tensile strength of 12.6/7.3 kg/mm$^2$ (17.86/10.35 PIM) and an MD/TD Modulus of 4.9 kg/mm$^2$ (7 PIM) and 1.7 kg/mm$^2$ (2.4 PIM).

EXAMPLE 6

In another test the same materials and equipment as in Example 5 are used to extrude a tubular casing. In this respect, the twin screw extruder is arranged to feed a 1.0 inch (25.4 mm) diameter annular extrusion die having a die gap of 0.020 inches (0.508 mm) with flow through the die being about 9.77 kg/hr.

The annular film, regenerated and treated with Kymene in the same way as the film of Example 5, was found to have a rewet MD/TD tensile strength of 10.9/4.6 kg/mm$^2$ (15.51/6.55 PIM) and a MD/TD modulus of 0.56 and 0.25 kg/cm-0.1 mm respectively.

The lower values of this tubular extruded film as compared to the ribbon extruded film of Example 5 are believed to be the result of a higher extrusion temperature in the tubular extrusion. In this respect, the back pressure in the annular die increases the residence time of the materials in the extruder and this raises the temperature of the slurry-dope mixture in the system to about 200° F. (93° C.). This higher temperature allows the NMMO cellulose solvent to solubilize the hemp fibers to a greater extent than at a lower temperature so that the benefits of having whole hemp fibers uniformly distributed throughout the regenerated cellulose matrix are lost. However, the test demonstrates tubular extrusion of the hemp slurry and dope mixture. Also, with the knowledge that the annular die used in this test results in a back pressure which increases residence time and raises the temperature of the mixture to unacceptable levels, it is well within the skill of the art to redesign the extrusion die to eliminate these drawbacks.

Thus, it should be appreciated that the present invention accomplishes its intended objects in providing a polyol-free crosslinked cellulose composite film comprising a regenerated cellulose matrix containing a uniform dispersion of a cellulose fiber. Moreover, the method of the present invention accomplishes the drying of the regenerated cellulose and the curing of the crosslinking agent in a single drying operation. The incorporation of poly(ethylene oxide) into the cellulose solution eliminates the need for a polyol plasticizer and does not interfere with the reaction of the crosslinking agent.

Having described the invention in detail, what is claimed as new is:

1. A method for producing a polyol-free cellulosic film composed of a regenerated cellulose matrix containing natural cellulose fibers comprising the steps of:

a) providing an extrudable thermoplastic composition composed of an aqueous solution of an amine oxide cellulose solvent, a nonderivatized cellulose solubilized in the solvent and an olefinic oxide polymer and the composition containing a uniform dispersion of unsolubilized cellulose fiber;

b) extruding a film of the thermoplastic composition;

c) washing the extruded thermoplastic composition with a nonsolvent to remove the amine oxide cellulose solvent and thereby regenerate the solubilized non derivatized cellulose to form a wet gel film comprising a continuous phase of regenerated cellulose containing the olefinic oxide polymer and the unsolubilized cellulose fiber uniformly dispersed in the continuous phase;

d) contacting the wet gel film with a crosslinking agent; and e) drying the wet gel film in the presence of the crosslinking agent to a moisture content sufficient to activate the agent and crosslink the regenerated cellulose and unsolubilized cellulose fibers and the amount of olefinic oxide polymer in the dry film being sufficient to plasticize the dry film so as to avoid the need for an addition of a polyol to plasticize the dry film.

2. A method as in claim 1 in which the olefinic oxide polymer is poly(ethylene oxide).

3. A method as in claim 2 in which the amount of poly(ethylene oxide)in the dry film is 1.6% to 2.3% based on the weight of the regenerated cellulose.

4. A method as in claim 1 where providing said thermoplastic composition comprises:

a) heating and mixing an aqueous amine oxide cellulose solvent, said olefinic oxide polymer and said cellulose fiber to prepare a slurry wherein said cellulose fiber and olefinic oxide polymer are uniformly dispersed in the cellulose solvent; and b) adding the slurry to a cellulose solution of amine oxide cellulose solvent, water and cellulose solubilized in the solvent and mixing to uniformly distribute the cellulose fiber in the slurry throughout the cellulose solution.

5. A method as in claim 4 wherein the slurry is composed, by weight, of about 55% to 73% cellulose solvent, 18% to 22% $H_2O$, 9% to 23% cellulose fiber and 0.4% to 0.8% olefinic oxide polymer.

6. A method as in claim 5 wherein the slurry is composed, by weight, of about 67% to 70% cellulose solvent, 18% to 20% $H_2O$, 9% to 13% cellulose fiber and 0.4% to 0.8% olefinic oxide polymer.

7. A method as in claim 6 wherein said cellulose fiber is hemp.

8. A method as in claim 1 wherein the thermoplastic composition comprises by weight 74% to 76% amine oxide cellulose solvent, 10% to 12% water, 9% to 11% solubilized cellulose, 3% to 8% unsolubilized cellulose fiber and 0.1% to 0.3% olefinic oxide polymer.

9. A method as in claim 8 wherein the thermoplastic composition comprises 3% to 5% unsolubilized cellulose fiber.

10. A method as in claim 9 wherein said cellulose fiber is hemp.

11. A method as in claim 1 wherein the cellulose crosslinking agent is a thermosetting epichlorohydrin-polyamide resin.

12. A method as in claim 1 comprising contacting the wet gel film with a 0.31% solution of a thermosetting epichlorohydrin-polyamide resin cellulose crosslinking agent.

13. A method as in claim 1 comprising drying the wet gel film to 5–10% total weight moisture to activate the crosslinking agent.

14. A method as in claim 13 including remoisturizing the dry film to about 10% to about 15% total weight moisture.

15. A method as in claim 1 wherein the solubilized nonderivatized cellulose is wood pulp and the cellulose fiber is hemp.

16. A crosslinked fibrous cellulosic composite film comprising a continuous phase of regenerated nonderivatized cellulose containing a uniform dispersion of unsolubilized cellulose fibers, an olefinic oxide polymer and an effective amount of a cellulose crosslinking agent, said film being formed by the extrusion of a thermoplastic composition composed of cellulose fibers dispersed in an aqueous solution of an amine oxide cellulose solvent, a nonderivatized cellulose solubilized in the solvent and an olefinic oxide polymer, the composition being sequentially extruded, washed to regenerate the solubilized nonderivatized cellulose, contacted with the crosslinking agent and then dried to activate the crosslinking agent, and said olefinic oxide polymer being a plasticizer for said film.

17. A film as in claim 16 containing 25% to 45% of unsolubilized cellulose fiber based on the total weight of cellulose in said film.

18. A film as in claim 17 wherein said unsolubilized cellulose fiber is hemp.

19. A film as in claim 16 comprising a seamless tubular film.

20. A film as in claim 16 comprising 1% to 2% olefinic oxide based on the total weight of cellulose in said film.

21. A film as in claim 16 wherein said film is polyol-free.

22. A film as in claim 16 having a moisture content of about 10% to about 15% based on total weight.

23. A film as in claim 16 wherein said film is polyol-free and has a moisture content of about 10% to about 15% based on the total weight.

* * * * *